United States Patent
Lefebvre et al.

(10) Patent No.: US 11,530,622 B2
(45) Date of Patent: Dec. 20, 2022

(54) BLADE CONTAINMENT ASSEMBLY FOR A GAS TURBINE ENGINE

(71) Applicant: PRATT & WHITNEY CANADA CORP., Longueuil (CA)

(72) Inventors: Guy Lefebvre, St-Bruno-de-Montarville (CA); Francois Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 41 days.

(21) Appl. No.: 17/072,212

(22) Filed: Oct. 16, 2020

(65) Prior Publication Data

US 2022/0120197 A1 Apr. 21, 2022

(51) Int. Cl.
| | |
|---|---|
| F01D 25/24 | (2006.01) |
| F04D 29/52 | (2006.01) |
| F01D 25/30 | (2006.01) |
| F02C 3/14 | (2006.01) |
| F01D 21/04 | (2006.01) |

(52) U.S. Cl.
CPC ......... *F01D 25/243* (2013.01); *F04D 29/522* (2013.01); *F05D 2240/30* (2013.01)

(58) Field of Classification Search
CPC ........ F01D 21/045; F01D 25/24; F01D 25/26; F01D 25/243; F01D 25/30; F01D 5/143; F01D 5/147; F01D 5/3061; F01D 5/282; F04D 29/522; F04D 29/526; F05D 2240/30; F05D 2240/14; F05D 2240/11; F05D 2220/32
See application file for complete search history.

(56) References Cited

U.S. PATENT DOCUMENTS

| | | | |
|---|---|---|---|
| 4,490,092 A | 12/1984 | Premont | |
| 4,598,449 A | 7/1986 | Monhardt et al. | |
| 8,297,912 B2 * | 10/2012 | Reed | F01D 25/24 |
| | | | 415/220 |
| 8,662,824 B2 * | 3/2014 | Chatelois | F01D 21/045 |
| | | | 415/173.1 |
| 2008/0086881 A1 | 4/2008 | Eleftheriou | |
| 2011/0036068 A1 * | 2/2011 | Lefebvre | F02K 1/48 |
| | | | 60/262 |
| 2012/0082541 A1 * | 4/2012 | Macchia | F01D 25/246 |
| | | | 415/200 |

FOREIGN PATENT DOCUMENTS

EP 2149680 A2 2/2010

OTHER PUBLICATIONS

European Search Report issued in counterpart application 21203248.6 dated Jun. 14, 2022.

\* cited by examiner

*Primary Examiner* — Eric J Zamora Alvarez
(74) *Attorney, Agent, or Firm* — Norton Rose Fulbright Canada LLP

(57) ABSTRACT

A blade containment assembly for a gas turbine engine comprises a casing having a first casing member surrounding a set of rotor blades and a second casing member extending axially from the first casing member. The first casing member has an outer annular wall welded to the second casing member at a weld joint disposed in a blade containment zone of the casing and an inner containment ring spaced radially inwardly from the outer annular wall and extending axially from a first location forward of the weld joint to a second location aft of the weld joint.

16 Claims, 2 Drawing Sheets

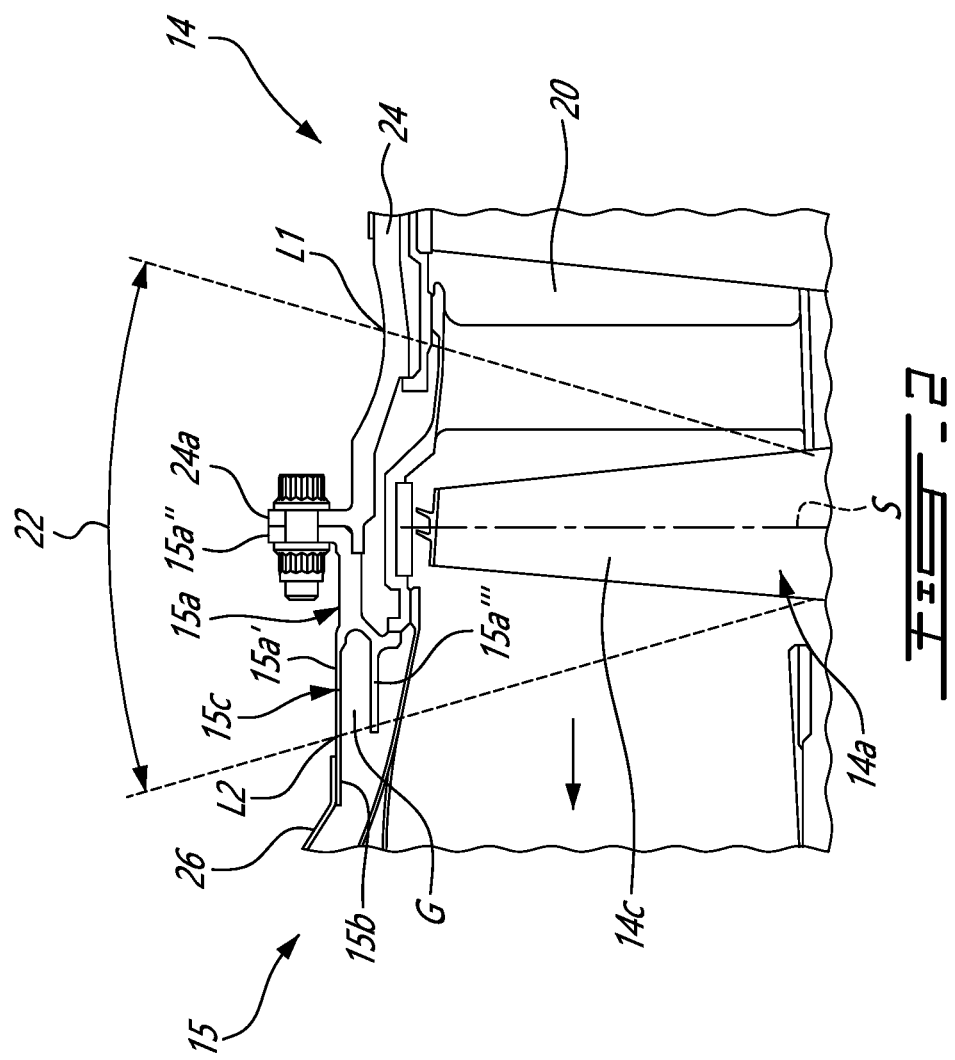

BLADE CONTAINMENT ASSEMBLY FOR A GAS TURBINE ENGINE

TECHNICAL FIELD

The application relates generally to gas turbine engines and, more particularly, to a blade containment assembly.

BACKGROUND OF THE ART

In a gas turbine engine, the portion of the engine case surrounding bladed rotors, such as turbine discs, need to be reinforced to preserve the integrity of the case in a blade off event. Features susceptible to weaken the engine case are, thus, typically avoided in the blade containment zone of the case. For instance, weld joints between casing members are typically disposed outside of the blade containment zone. However, in some applications, this may not always be practical.

SUMMARY

In one aspect, there is provided a blade containment assembly for a gas turbine engine having a rotor mounted for rotation about an engine axis, the rotor having a set of rotor blades; the blade containment assembly comprising: a casing having a first casing member surrounding the set of rotor blades and a second casing member extending axially from the first casing member; the first casing member having: an outer annular wall welded to the second casing member at a weld joint disposed in a blade containment zone of the casing, and an inner containment ring spaced radially inwardly from the outer annular wall and extending axially from a first location forward of the weld joint to a second location aft of the weld joint.

In another aspect, there is provided an exhaust case assembly for a gas turbine engine having a turbine rotor mounted for rotation about an engine axis, the turbine rotor having a set of turbine blades; the exhaust case assembly comprising: a flange ring having a monolithic body including an outer annular wall and an inner containment ring spaced-radially inwardly from the outer annular wall, the outer annular wall having a flange for connection to an associated flange of an adjacent turbine case surrounding the set of turbine blades, and a sheet metal outer case extending axially from the outer annular wall of the flange ring, the sheet metal outer case welded to the outer wall of the flange ring at a weld joint disposed in a blade containment zone axially spanning the set of turbine blades, the inner containment ring extending axially from a first location on a first side of the weld joint to a second location on a second opposite side of the weld joint.

In a further aspect, there is provided a gas turbine engine comprising: a turbine including a turbine rotor having a set of turbine blades mounted for rotation about an axis, and a turbine case surrounding the set of turbine blades, the turbine case having a blade containment zone extending axially from a first location on first side of the turbine rotor to a second location on a second opposed side of the turbine rotor, the turbine case having a monolithic body including an outer annular wall having a localized weakness point disposed in the blade containment zone, the monolithic body further including an inner containment ring integrally connected to the outer annular wall and spaced radially inwardly therefrom so as to define an annular gap, the inner containment ring having a thickness selected to contain a turbine blade in the event of a blade ejection, the inner containment ring axially spanning the localized weakness point in the outer wall.

DESCRIPTION OF THE DRAWINGS

Reference is now made to the accompanying figures in which:

FIG. 2 is an enlarged schematic longitudinal/axial cross-section of a last stage of turbine blades surrounded by a blade containment assembly including a weld joint in a blade containment zone.

DETAILED DESCRIPTION

Figure 1:
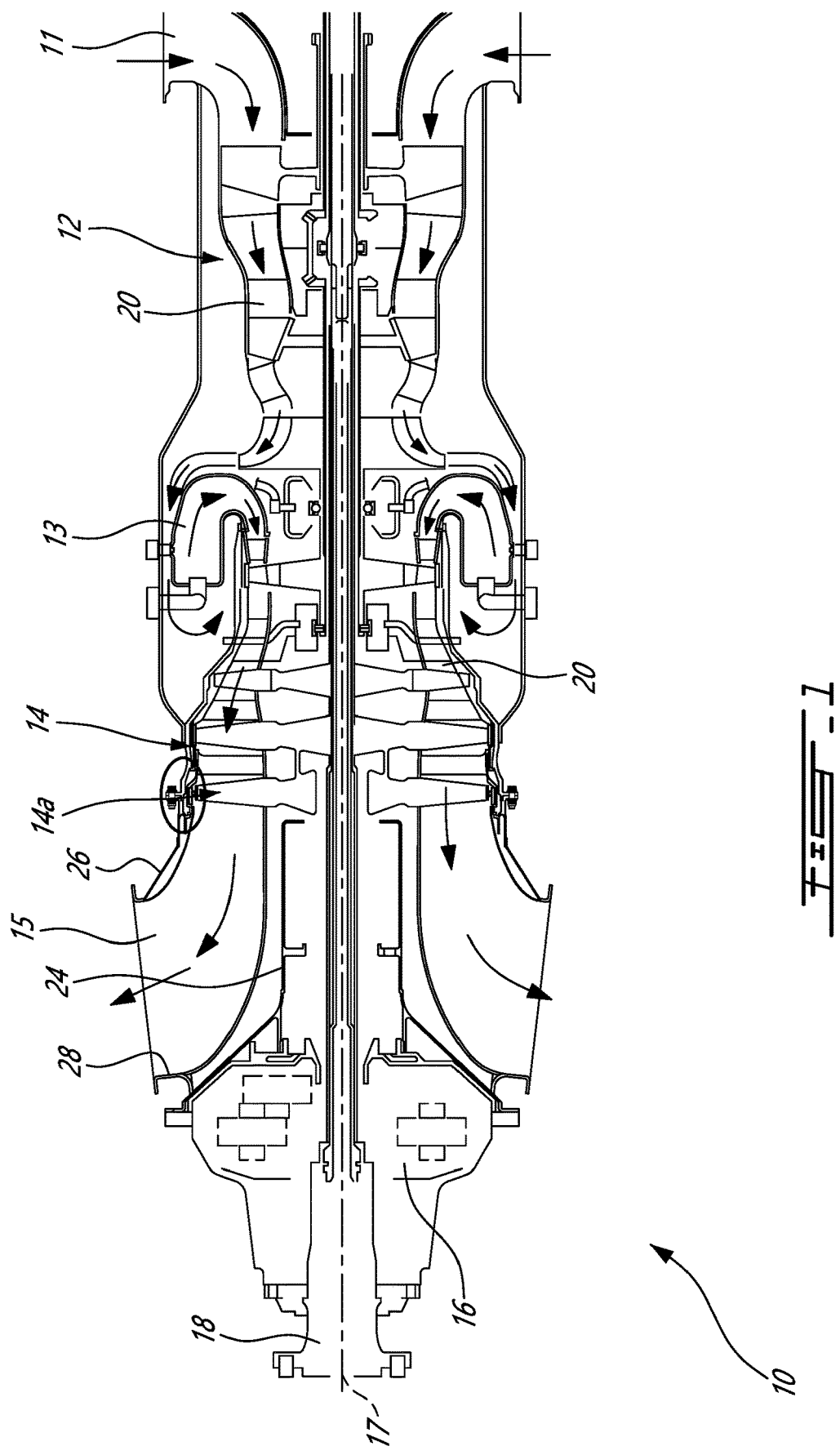
FIG. 1 is a schematic longitudinal/axial cross-section view of an exemplary gas turbine engine.

FIG. 1 illustrates a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. The turbine 14 includes a low pressure or power turbine 14a drivingly connected to an input end of a reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17.

The gas turbine engine 10 has an axially extending central core which defines an annular gaspath 20 through which gases flow, as depicted by flow arrows in FIG. 1. The exemplary embodiment shown in FIG. 1 is a "reverse-flow" engine because gases flow through the gaspath 20 from the air inlet 11 at a rear portion thereof, to the exhaust 15 at a front portion thereof. According to one aspect, the engine 10 can have an engine architecture corresponding to that of the engine described in applicant's U.S. Pat. No. 10,393,027 issued on Aug. 27, 2019, the entire content of which is herein incorporated by reference. However, it is understood that the engine could adopt different configurations, including a through flow configuration, the engine configuration illustrated in FIG. 1 being provided for context purposes only.

FIG. 2 is a schematic enlarged view of the region of the engine encircled in FIG. 1. More particularly, FIG. 2 is a partial view of the turbine 14 and the exhaust 15. As will be seen herein below, FIG. 2 illustrates an example of a case assembly configured to allow for the provision of a weld joint in a blade containment zone. In gas turbine engines, the portion of the engine case surrounding bladed rotors, such as turbine rotors, is reinforced to contain blade fragments or blades and preserve the structural integrity of the case in the event of a blade ejection event. It is not recommended to have welds or other features that could potentially weaken the case (e.g. a hole) in the vicinity of the rotor blades, unless a separate containment ring protects the welds or the weakened region. However, in some engine regions, like the region between the turbine 14 and the exhaust 15, the space available is limited and, thus, the addition of a separate containment ring may not always be possible. Accordingly, the practice has been heretofore to thicken the case around the turbine blades and to move any weld joint axially away from the containment zone. However, it may not always be possible or desirable to do so. In one aspect, the present disclosure provides a means of adding a containment ring without the need to move the weld or another weakened feature (e.g. a hole) and to add a separate containment part.

In the particular example shown in FIG. 2, the case assembly includes a blade containment zone 22 for use in blade containment in the event of a blade release event. The blade containment zone 22 as used herein is defined as a zone extending both axially and circumferentially around where a turbine blade or blade fragment is most likely to be ejected from the bladed rotor (e.g. the power turbine 14a). According to one aspect, the blade containment zone 22 has a longitudinal length that is at least sufficient to enclose the turbine blades 14c of the power turbine 14a. According to another aspect and as shown in FIG. 2, the containment zone 22 runs from a first location L1 upstream of the power turbine blades 14c relative to a flow of gas through the turbine 14 to a second location L2 downstream of the power turbine blades 14c. According to a further aspect, the blade containment zone 22 can be defined by a sector of a circle having an origin at an intersection between the blade stacking line S and the engine centerline 17. For instance, the blade containment sector can have an angle of 20 degrees on each side of the blade stacking line S. According to one particular example, the blade containment sector has an angle of 15 degrees on each side of the blade stacking line S. The person skilled in the art will understand that the blade containment zone 22 can vary depending on the engine operating parameters and design. The above angle values are, thus, given for illustration purposes only.

Still referring to FIG. 2, it can be seen that the exhaust 15 has an exhaust case assembly having an upstream end portion thereof extending into the containment zone 22. Accordingly, this end portion of the exhaust case assembly is configured to perform the required blade containment function. More particularly, the exemplified exhaust case assembly comprises a first casing member 15a and a second casing member 15b welded to the first casing member 15a at a weld joint 15c located within the blade containment zone 22. As will be seen hereinafter, the first casing member 15a is configured to protect/shield the weld joint 15c from the blades 14c in the event of a blade off event, thereby allowing the provision of a weld joint or another weakened feature (e.g. a hole or the like) in the blade containment zone 22.

According to the illustrated example, the first casing member 15a and the second casing member 15b are respectively provided in the form of a flange ring and a sheet metal outer case. The flange ring 15a may be forged or otherwise formed to provide the required blade containment function in the blade containment zone 22. As shown in FIG. 2, the flange ring 15a has a monolithic body including an outer annular wall 15a' and an inner containment ring 15a'''. The exemplified weld joint 15c is provided in the form of a butt joint at the interface between the outer wall 15a' and the sheet metal outer case 15b radially outwardly of the inner containment ring 15a'''. The outer wall 15a' has a flange 15a'' at the end thereof opposite to the weld joint 15c. The flange 15a'' is bolted to a corresponding flange 24a of a turbine support case 24. According to the embodiment shown in FIG. 2, the flanges 15a'' and 24a are disposed generally centrally within the containment zone 22 in axial alignment with the turbine blades 14c.

The inner containment ring 15a''' extends radially inwardly of the outer wall 15a' of the flange ring 15a. As shown in FIG. 2, the inner containment ring 15a''' is spaced radially inwardly from the outer wall 15a' by an annular gap G. The inner containment ring 15a''' may be machined into the monolithic forged body of the flange ring 15a or otherwise suitably formed as an integral part therewith. The radial thickness of the inner containment ring 15a''' is selected to contain the blade fragments or blades during a blade off event (it is sized in thickness for dissipating the ejection energy). The inner containment ring 15a''' extends axially from a first location forward of the weld joint 15c (left hand side in FIG. 2) to a second location aft of the weld joint 15c (right hand side in FIG. 2). By so axially spanning the weld joint 15c, the inner containment ring 15a''' forms a physical barrier between the weld joint 15c and the blades 14c, thereby preventing any released blades or blade fragments from impacting upon the weld joint 15c. The well joint 15c is thus protected from blade impacts by the inner containment ring 15a''', This allows the portion of the outer wall 15a' which axially overlap the inner containment ring to be thinner so as to have a thickness which generally correspond to that of the sheet metal outer case 15b to which it is welded. Indeed, from FIG. 2, it can be appreciated that the outer wall 15a' at the weld joint 15c is much thinner than the inner containment ring 15a'''. However, the opposed end portion of the outer wall 15a' with flange 15a'' does not axially overlap the inner containment ring 15a''' and is, thus, thicker so as to be able to contain any release blades during a blade off event. The inner containment ring 15a''' merges with the thick flange end portion of the outer wall via a rounded web portion. As can be appreciated from FIG. 2, the closed end of the annular gap G can be machined so as to define a rounded end to avoid stress concentration.

Still referring to FIG. 2, it can be seen that the exhaust case assembly further comprises exhaust port stiffeners 26 welded at a lap joint to an outer surface of the sheet metal outer case 15 to provide support to the exhaust duct tail pipes 28 (FIG. 1). The stiffeners 26 are welded to the sheet metal outer case 15b outside of the containment zone 22. The location of the weld joint 15c between the flange ring 15a and the outer case 15b in the containment zone 22 provides additional space to weld the stiffeners 26 to the outer case 15b. Indeed, if the weld joint 15c had to be located outside of the containment zone 22, the weld between the stiffeners 26 and the outer case 15b would have had to be moved axially further away from the containment zone 22. This would have increase the axial length of the engine 10.

According to at least some embodiments, the containment ring 15a''' is machined as part of the flange ring 15a on a smaller diameter than the sheet metal outer case 15b allowing for the weld joint 15c to be disposed within the containment zone 22. This containment geometrical concept of the flange ring 15a allows protecting the weld joint 15c in the event of a blade release. The positioning of the weld joint 15c in the containment zone 22 provides more space for the exhaust duct tail pipes support arrangement.

According to at least some embodiments, it can be appreciated that the configuration of the flange ring 15a with its integrated inner containment ring 15a''' allows for a compact flange design, thereby proving additional space to design the tail pipes exit duct. Eliminating the need for a separate containment ring may also provide weight savings.

In accordance with another aspect, there is provided a method of manufacturing a gas turbine engine blade containment arrangement comprising: providing a casing member with an outer annular wall and an integral inner containment ring radially inwardly from the outer annular wall, the inner containment ring having a thickness selected to contain blade fragments in the event of blade release.

According to a further aspect, the method comprises forging the casing member and machining the inner containment ring directly into the forged body.

According to a still further aspect, the method comprises welding the outer wall to a second casing member, the inner containment ring extending underneath the weld.

The above description is meant to be exemplary only, and one skilled in the art will recognize that changes may be made to the embodiments described without departing from the scope of the invention disclosed. For instance, the blade containment assembly could be used in other areas of the engine. For instance, it could be used along the turbine support case. Also, the inner containment ring 15a''' could be used to protect various weakened structures and thus not only weld joint between two casing members. For instance, it could protect a boss welded to a turbine case or casing wall with a hole defined therein. Other modifications which fall within the scope of the present invention will be apparent to those skilled in the art, in light of a review of this disclosure, and such modifications are intended to fall within the appended claims.

The invention claimed is:

1. A blade containment assembly for a gas turbine engine having a rotor mounted for rotation about an engine axis, the rotor having a set of rotor blades; the blade containment assembly comprising:
a casing having a first casing member surrounding the set of rotor blades and a second casing member extending axially from the first casing member;
the first casing member having an outer annular wall welded to the second casing member at a weld joint disposed in a blade containment zone of the casing, and an inner containment ring spaced radially inward from the outer annular wall and extending axially from a first location forward of the weld joint to a second location aft of the weld joint in the blade containment zone, wherein the outer annular wall of the first casing member has a flange bolted to a third casing member, the flange disposed in the blade containment zone.

2. The blade containment assembly according to claim 1, wherein the first casing member is a forged exhaust case flange ring, and wherein the second casing member is a sheet metal exhaust case.

3. The blade containment assembly according to claim 2, wherein exhaust port stiffeners are welded to the sheet metal exhaust case at a location axially spaced-apart from the weld joint between the first and second casing members and outside of the blade containment zone.

4. The blade containment assembly according to claim 1, wherein the inner containment ring has a radial wall thickness greater than a radial wall thickness of the outer annular wall at the weld joint.

5. The blade containment assembly according to claim 1, wherein the inner containment ring and the outer annular wall of the first casing member are integrated into a monolithic body.

6. The blade containment assembly according to claim 1, wherein an annular gap is provided radially between the outer annular wall and the inner containment ring of the first casing member.

7. The blade containment assembly according to claim 1, wherein the weld joint is a butt joint and is disposed axially downstream of the set of rotor blades relative to a gas flow through the set of rotor blades.

8. An exhaust case assembly for a gas turbine engine having a turbine rotor mounted for rotation about an engine axis, the turbine rotor having a set of turbine blades; the exhaust case assembly comprising:
a flange ring having a monolithic body including an outer annular wall and an inner containment ring spaced radially inward from the outer annular wall, the outer annular wall having a flange bolted to an associated flange of an adjacent turbine case surrounding the set of turbine blades, and
a sheet metal outer case extending axially from the outer annular wall of the flange ring, the sheet metal outer case welded to the outer annular wall of the flange ring at a weld joint disposed in a blade containment zone axially spanning the set of turbine blades, the inner containment ring extending axially from a first location on a first side of the weld joint to a second location on a second opposite side of the weld joint;
wherein the flange of the outer annular wall is disposed in the blade containment zone.

9. The exhaust case assembly according to claim 8, wherein the flange is axially aligned with the set of turbine blades.

10. The exhaust case assembly according to claim 8, wherein the inner containment ring is machined into the monolithic body with an annular gap between the outer annular wall and the inner containment ring.

11. The exhaust case assembly according to claim 8, wherein exhaust port stiffeners are welded to the sheet metal outer case at a location axially spaced-apart from the weld joint outside of the blade containment zone.

12. The exhaust case assembly according to claim 8, wherein the inner containment ring has a radial wall thickness greater than a radial wall thickness of the outer annular wall at the weld joint.

13. The exhaust case assembly according to claim 8, wherein the weld joint is a butt joint and is disposed axially downstream of the set of turbine blades relative to a gas flow through the set of turbine blades.

14. A gas turbine engine comprising:
a turbine including a turbine rotor having a set of turbine blades mounted for rotation about an axis, and
a turbine case surrounding the set of turbine blades, the turbine case having a blade containment zone extending axially from a first location on a first side of the turbine rotor to a second location on a second opposed side of the turbine rotor, the turbine case having a monolithic body including an outer annular wall having a localized weakness point disposed in the blade containment zone, the localized weakness point including a weld joint between a first and a second casing member, the monolithic body further including an inner containment ring integrally connected to the outer annular wall and spaced radially inward therefrom so as to define an annular gap, the inner containment ring having a thickness selected to contain a turbine blade in an event of a blade ejection, the inner containment ring axially spanning the localized weakness point in the outer annular wall,
wherein the first casing member has a flange bolted to a third casing member, the flange disposed in the blade containment zone.

15. The gas turbine engine according to claim 14, wherein stiffeners are welded to the second casing member at a location axially spaced-apart from the weld joint outside of the blade containment zone.

16. The gas turbine engine according to claim 14, wherein the weld joint is disposed axially downstream of the set of turbine blades relative to a gas flow through the set of turbine blades.

* * * * *